(12) United States Patent
Um et al.

(10) Patent No.: US 11,410,588 B1
(45) Date of Patent: Aug. 9, 2022

(54) DISPLAY DEVICE

(71) Applicant: LG ELECTRONICS INC., Seoul (KR)

(72) Inventors: Taeha Um, Seoul (KR); Hyunchul Noh, Seoul (KR); Seongyeol Ahn, Seoul (KR); Sangjun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/236,670

(22) Filed: Apr. 21, 2021

(30) Foreign Application Priority Data

Jan. 29, 2021 (KR) .................. 10-2021-0012815

(51) Int. Cl.
*G09G 3/20* (2006.01)
*H04N 19/132* (2014.01)

(52) U.S. Cl.
CPC ............. *G09G 3/20* (2013.01); *H04N 19/132* (2014.11); *G09G 2340/0435* (2013.01); *G09G 2370/08* (2013.01); *G09G 2370/10* (2013.01)

(58) Field of Classification Search
CPC ...... G01R 31/085; G01R 27/20; G01R 1/073; G01S 11/14; G01S 15/42; G01S 15/8925; G01S 15/02; G06T 7/11
See application file for complete search history.

(56) References Cited

U.S. PATENT DOCUMENTS

| 9,628,740 B2 | 4/2017 | Glen |
| 2002/0003704 A1* | 1/2002 | Ohmae ................. F21S 10/007 348/E5.143 |
| 2004/0001608 A1* | 1/2004 | Rhoads ............ G11B 20/00891 704/E19.009 |
| 2006/0177144 A1 | 8/2006 | Kang et al. |
| 2009/0002490 A1* | 1/2009 | Saito ...................... H04N 7/181 348/143 |
| 2009/0161017 A1 | 6/2009 | Glen |

(Continued)

FOREIGN PATENT DOCUMENTS

| JP | 2004112695 | 4/2004 |
| JP | 2007082060 | 3/2007 |

(Continued)

OTHER PUBLICATIONS

Korean Intellectual Property Office Application No. 10-2021-0012815, Office Action dated May 16, 2022, 5 pages.

(Continued)

*Primary Examiner* — Shaheda A Abdin
(74) *Attorney, Agent, or Firm* — Lee, Hong, Degerman, Kang & Waimey PC

(57) ABSTRACT

A display device includes a display unit, an external device interface unit configured to receive video having a second frequency from a set-top box converting an original video having a first frequency into the video having the second frequency, and a control unit configured to: determine whether an abnormal output state is detected, based on the video having the second frequency; when the abnormal output state is detected, determine the number of interpolation frames to be generated so as to output the original video having the first frequency as final video having a third frequency through the display unit; and generate interpolation frames as many as the determined number of interpolation frames.

10 Claims, 14 Drawing Sheets

(56) References Cited

U.S. PATENT DOCUMENTS

| | | | | |
|---|---|---|---|---|
| 2010/0066872 A1* | 3/2010 | Yamaguchi | ............ | H04N 5/367 348/E5.022 |
| 2010/0150519 A1 | 6/2010 | Takanohashi et al. | | |
| 2019/0128730 A1* | 5/2019 | Stuart | ................. | H04R 29/008 |

FOREIGN PATENT DOCUMENTS

| | | |
|---|---|---|
| JP | 2010141632 | 6/2010 |
| KR | 1020100110832 | 10/2010 |

OTHER PUBLICATIONS

PCT International Application No. PCT/KR2021/004859, International Search Report dated May 24, 2022, 3 pages.

\* cited by examiner

| Input \ Output | 12 | 15 | 24 | 25 | 30 | 48 | 50 | 60 |
|---|---|---|---|---|---|---|---|---|
| 12 | 11 | X | 22 | X | 32 / 3223 / 2224 | 44 | X | 55 |
| 15 | X | 11 | X | X | 22 | X | 334 | 44 |
| 24 | X | X | 11 | X | 1112 | 22 | 11'23 | 32 / 3223 / 2224 |
| 25 | X | X | X | 11 | 11112 | 44 | 22 | 32322 / 22224 |
| 30 | X | X | X | X | 11 | 44 | 122 | 22 |
| 48 | X | X | X | X | X | 11 | X | 1112 |
| 50 | X | X | X | X | X | X | 11 | 11112 |
| 30 | X | X | X | X | X | X | X | 11 |

FIG. 13
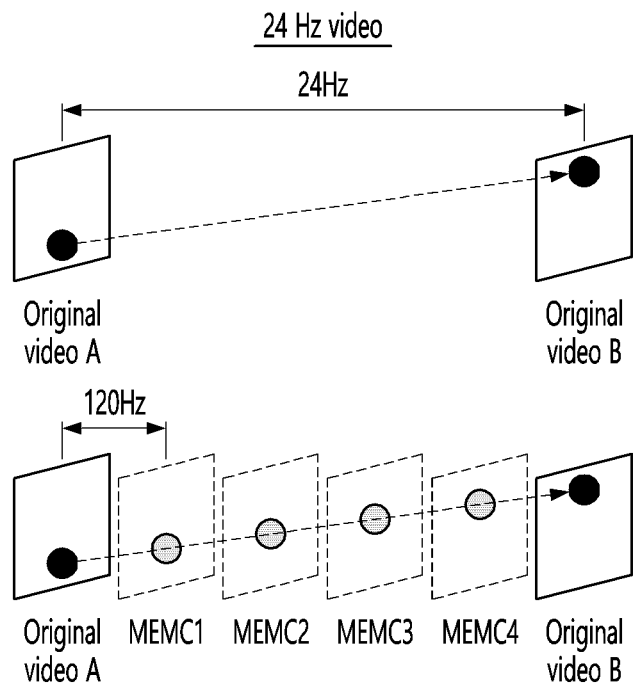
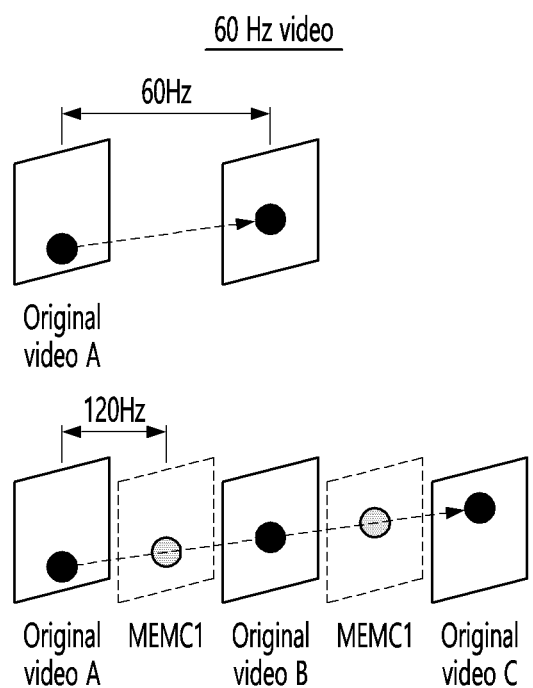

FIG. 15

① When signal is constantly input, after calculation is completed, calculation is performed while shifting one by one

| | | | | | | | | | | | | | | | | | | | | | | | | |
|---|---|---|---|---|---|---|---|---|---|---|---|---|---|---|---|---|---|---|---|---|---|---|---|---|
| 1501 | Cadence | 3 | 2 | 3 | 2 | 3 | 2 | 3 | 2 | 3 | 2 | 3 | 2 | 3 | 2 | 3 | 2 | 3 | 2 | 3 | 2 | 3 | 2 | 23 |
| 1503 | 60 to 120Hz (F) | 6 | 4 | 6 | 4 | 6 | 4 | 6 | 4 | 6 | 4 | 6 | 4 | 6 | 4 | 6 | 4 | 6 | 4 | 6 | 4 | 6 | 4 | 46 |
| 1505 | Number (F-1) of frames to be generated | 5 | 3 | 5 | 3 | 5 | 3 | 5 | 3 | 5 | 3 | 5 | 3 | 5 | 3 | 5 | 3 | 5 | 3 | 5 | 3 | 5 | 3 | 35 |
| 1507 | Number of interpolation frames (present disclosure) | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 44 |
| 1509 | Number of interpolation frames (conventional) | 4 | 4 | 4 | 4 | 4 | 4 | 4 | 4 | 4 | 4 | 4 | 4 | 4 | 4 | 4 | 4 | 4 | 4 | 4 | 4 | 4 | 4 | 44 |

FIG. 16

② When signal is not constant, after calculation is completed, calculation is performed while shifting one by one

| | | | | | | | | | | | | | | | | | | | | | | | | |
|---|---|---|---|---|---|---|---|---|---|---|---|---|---|---|---|---|---|---|---|---|---|---|---|---|
| 1501 | Cadence | 3 | 2 | 3 | 2 | 3 | 3 | 2 | 3 | 2 | 3 | 2 | 3 | 2 | 3 | 2 | 3 | 2 | 3 | 2 | 3 | 2 | 3 | 2 |
| 1503 | 60 to 120Hz (F) | 6 | 4 | 6 | 4 | 6 | 6 | 4 | 6 | 4 | 6 | 4 | 6 | 4 | 6 | 4 | 6 | 4 | 6 | 4 | 6 | 4 | 6 | 4 |
| 1505 | Number (F-1) of frames to be generated | 5 | 3 | 5 | 3 | 5 | 5 | 3 | 5 | 3 | 5 | 3 | 5 | 3 | 5 | 3 | 5 | 3 | 5 | 3 | 5 | 3 | 5 | 3 |
| 1507 | Number of interpolation frames (present disclosure) | | | | | | 4 | 4 | 4 | 2 | 4 | 4 | 4 | 4 | 4 | 4 | 4 | 4 | 4 | 4 | 4 | 4 | 4 | 4 |
| 1509 | Number of interpolation frames (conventional) | | | | 4 | 4 | 4 | 4 | 2 | 4 | 4 | 4 | 4 | 4 | 4 | 4 | 4 | 4 | 4 | 4 | 4 | 4 | 4 | 4 |

DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2021-0012815, filed on Jan. 29, 2021, the contents of which are hereby incorporated by reference herein in its entirety.

BACKGROUND

The present disclosure relates to a display device.

In video cadence, original source video having various frequencies may be converted into video having different frequencies while passing through a set-top box. In this process, a periodic frame sequence is formed.

A display device may determine a frame rate (frequency) of original source video from video received from a set-top box, perform motion estimation/compensation, and output the video naturally.

However, the set-top box is designed to output video with a fixed output frequency, but in practice, video having a fixed output frequency cannot be output, and a bad-editing phenomenon in which video cadence is changed or frames are missing may occur.

This brings about a feeling of disconnection of video, which may greatly hinder a user's viewing.

SUMMARY

The present disclosure provides a display device capable of naturally outputting video by referring to a previous video frame pattern.

The present disclosure also provides a display device capable of appropriately generating the number of interpolation frames by referring to a previous video frame pattern.

A display device according to an embodiment of the present disclosure includes a display unit, an external device interface unit configured to receive video having a second frequency from a set-top box converting an original video having a first frequency into the video having the second frequency, and a control unit configured to: determine whether an abnormal output state is detected, based on the video having the second frequency; when the abnormal output state is detected, determine the number of interpolation frames to be generated so as to output the original video having the first frequency as final video having a third frequency through the display unit; and generate interpolation frames as many as the determined number of interpolation frames.

The details of one or more embodiments are set forth in the accompanying drawings and the description below. Other features will be apparent from the description and drawings, and from the claims.

BRIEF DESCRIPTION OF THE DRAWINGS

FIG. 11 is a diagram describing a cadence combination table according to an embodiment of the present disclosure.

FIG. 13 is a diagram describing that, when a frequency of an original video is different, the number of interpolation frames generated is different.

FIG. 15 is a diagram for comparing an example of determining the number of interpolation frames when bad-editing does not occur, according to a conventional embodiment and an embodiment of the present disclosure.

FIG. 16 is a diagram for comparing an example of determining the number of interpolation frames when bad-editing occurs, according to a conventional embodiment and an embodiment of the present disclosure.

DETAILED DESCRIPTION OF THE EMBODIMENTS

Hereinafter, the present disclosure will be described in more detail with reference to the drawings.

Figure 1:
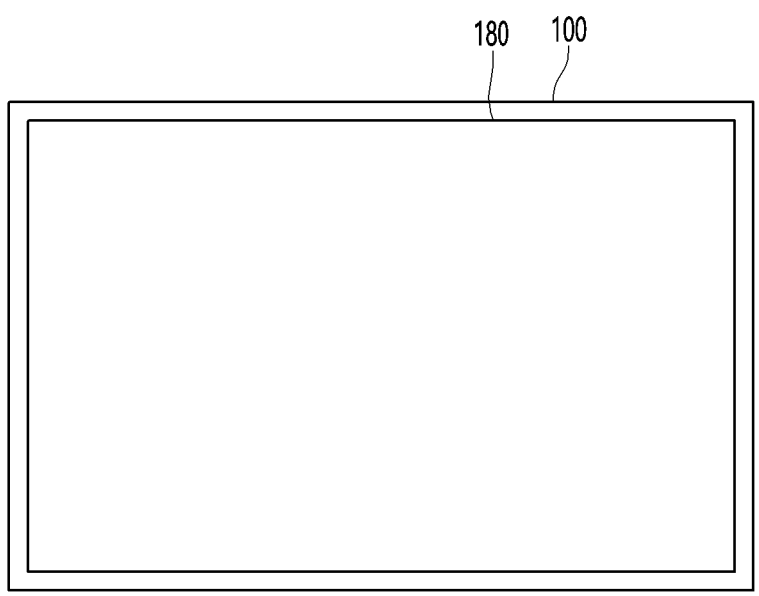
FIG. 1 is a diagram illustrating a display device according to an embodiment of the present disclosure.

FIG. 1 is a diagram illustrating a display device according to an embodiment of the present disclosure.

Referring to the drawings, a display device 100 may include a display unit 180.

Meanwhile, the display unit 180 may be implemented with any one of various panels. For example, the display unit 180 may be any one of a liquid crystal display panel (LCD panel), an organic light emitting diode panel (OLED panel), and an inorganic light emitting diode panel (LED panel).

In the present disclosure, it is assumed that the display unit 180 includes an organic light emitting diode panel (OLED panel). It should be noted that this is only exemplary, and the display unit 180 may include a panel other than an organic light emitting diode panel (OLED panel).

Meanwhile, the display device 100 of FIG. 1 may be a monitor, a TV, a tablet PC, or a mobile terminal.

Figure 2:
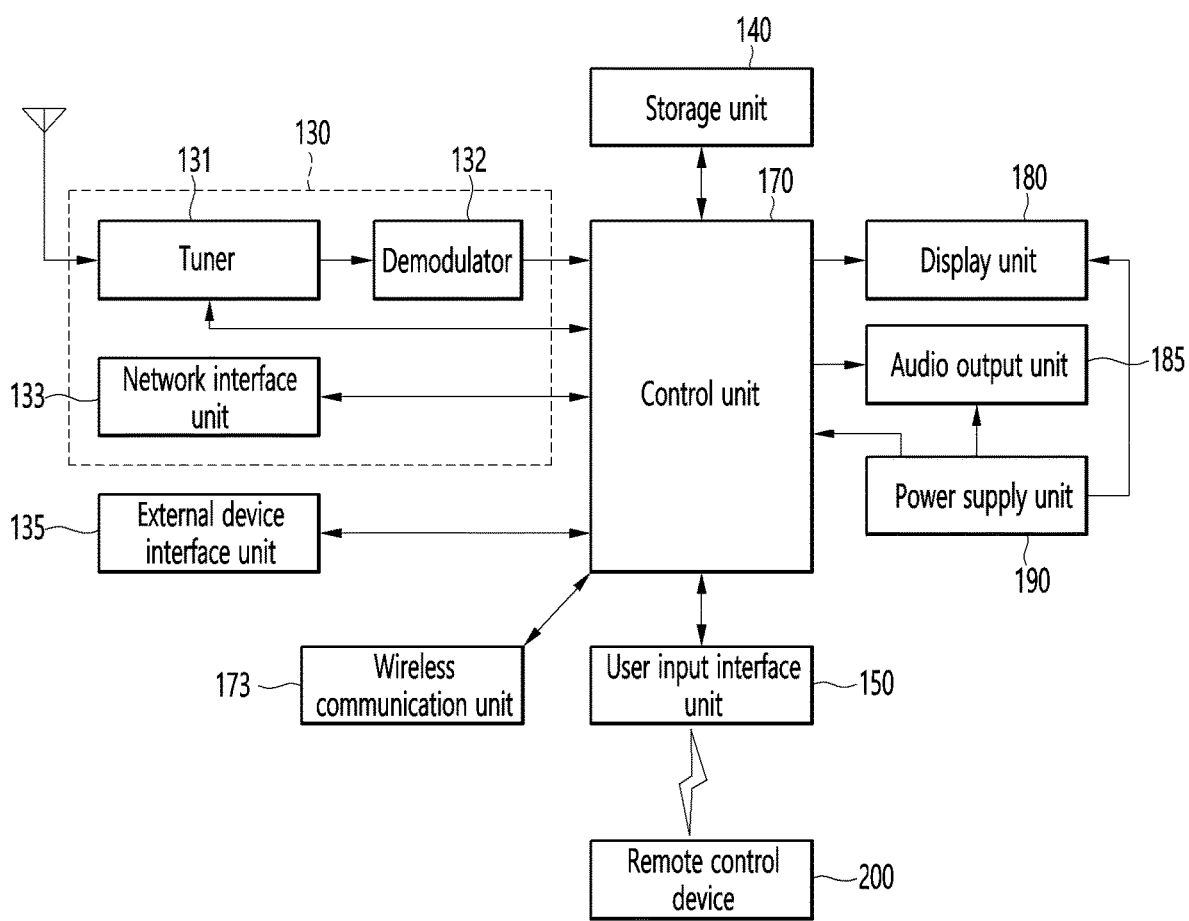
FIG. 2 is a block diagram showing a configuration of the display device of FIG. 1.

FIG. 2 is a block diagram showing a configuration of the display device of FIG. 1.

Referring to FIG. 2, the display device 100 may include a broadcast receiving unit 130, an external device interface unit 135, a storage unit 140, a user input interface unit 150, a control unit 170, and a wireless communication unit 173, a display unit 180, an audio output unit 185, and a power supply unit 190.

The broadcast receiving unit 130 may include a tuner 131, a demodulator 132, and a network interface unit 133.

The tuner 131 may select a specific broadcast channel according to a channel selection command. The tuner 131 may receive a broadcast signal for the selected specific broadcast channel.

The demodulator 132 may separate the received broadcast signal into a video signal, an audio signal, and a data signal related to a broadcast program, and restore the separated video signal, audio signal, and data signal to a format capable of being output.

The network interface unit 133 may provide an interface for connecting the display device 100 to a wired/wireless network including an Internet network. The network interface unit 133 may transmit or receive data to or from other users or other electronic devices through a connected network or another network linked to the connected network.

The network interface unit 133 may access a predetermined web page through the connected network or the other network linked to the connected network. That is, it is possible to access a predetermined web page through a network, and transmit or receive data to or from a corresponding server.

In addition, the network interface unit 133 may receive content or data provided by a content provider or a network operator. That is, the network interface unit 133 may receive content such as a movie, advertisement, game, VOD, broadcast signal, and related information provided by a content provider or a network provider through a network.

In addition, the network interface unit 133 may receive update information and update files of firmware provided by the network operator, and may transmit data to an Internet or content provider or a network operator.

The network interface unit 133 may select and receive a desired application from among applications that are open to the public through a network.

The external device interface unit 135 may receive an application or a list of applications in an external device adjacent thereto, and transmit the same to the control unit 170 or the storage unit 140.

The external device interface unit 135 may provide a connection path between the display device 100 and the external device. The external device interface unit 135 may receive one or more of video and audio output from an external device wirelessly or wired to the display device 100 and transmit the same to the control unit 170. The external device interface unit 135 may include a plurality of external input terminals. The plurality of external input terminals may include an RGB terminal, one or more High Definition Multimedia Interface (HDMI) terminals, and a component terminal.

The video signal of the external device input through the external device interface unit 135 may be output through the display unit 180. The audio signal of the external device input through the external device interface unit 135 may be output through the audio output unit 185.

The external device connectable to the external device interface unit 135 may be any one of a set-top box, a Blu-ray player, a DVD player, a game machine, a sound bar, a smartphone, a PC, a USB memory, and a home theater, but this is only an example.

In addition, a part of content data stored in the display device 100 may be transmitted to a selected user among a selected user or a selected electronic device among other users or other electronic devices registered in advance in the display device 100.

The storage unit 140 may store programs for signal processing and control of the control unit 170, and may store video, audio, or data signals, which have been subjected to signal-processed.

In addition, the storage unit 140 may perform a function for temporarily storing video, audio, or data signals input from an external device interface unit 135 or the network interface unit 133, and store information on a predetermined video through a channel storage function.

The storage unit 140 may store an application or a list of applications input from the external device interface unit 135 or the network interface unit 133.

The display device 100 may play back a content file (a moving image file, a still image file, a music file, a document file, an application file, or the like) stored in the storage unit 140 and provide the same to the user.

The user input interface unit 150 may transmit a signal input by the user to the control unit 170 or a signal from the control unit 170 to the user. For example, the user input interface unit 150 may receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the control unit 170 to the remote control device 200.

In addition, the user input interface unit 150 may transmit a control signal input from a local key (not shown) such as a power key, a channel key, a volume key, and a setting value to the control unit 170.

The video signal image-processed by the control unit 170 may be input to the display unit 180 and displayed with video corresponding to a corresponding video signal. Also, the video signal image-processed by the control unit 170 may be input to an external output device through the external device interface unit 135.

The audio signal processed by the control unit 170 may be output to the audio output unit 185. Also, the audio signal processed by the control unit 170 may be input to the external output device through the external device interface unit 135.

In addition, the control unit 170 may control the overall operation of the display device 100.

In addition, the control unit 170 may control the display device 100 by a user command input through the user input interface unit 150 or an internal program and connect to a network to download an application a list of applications or applications desired by the user to the display device 100.

The control unit 170 may allow the channel information or the like selected by the user to be output through the display unit 180 or the audio output unit 185 along with the processed video or audio signal.

In addition, the control unit 170 may output a video signal or an audio signal through the display unit 180 or the audio output unit 185, according to a command for playing back a video of an external device through the user input interface unit 150, the video signal or the audio signal being input from an external device, for example, a camera or a camcorder, through the external device interface unit 135.

Meanwhile, the control unit 170 may allow the display unit 180 to display a video, for example, allow a broadcast video which is input through the tuner 131 or an external input video which is input through the external device interface unit 135, a video which is input through the network interface unit or a video which is stored in the storage unit 140 to be displayed on the display unit 180. In this case, the video displayed on the display unit 180 may be a still image or a moving image, and may be a 2D image or a 3D image.

In addition, the control unit 170 may allow content stored in the display device 100, received broadcast content, or external input content input from the outside to be played back, and the content may have various forms such as a broadcast video, an external input video, an audio file, still images, accessed web screens, and document files.

The wireless communication unit 173 may communicate with an external device through wired or wireless communication. The wireless communication unit 173 may perform short range communication with an external device. To this end, the wireless communication unit 173 may support short range communication using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication unit 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication unit 173 may detect (or recognize) a wearable device capable of communication around the display device 100. Furthermore, when the detected wearable device is an authenticated device to communicate with the display device 100 according to the present disclosure, the control unit 170 may transmit at least a portion of data processed by the display device 100 to the wearable device through the wireless communication unit 173. Therefore, a user of the wearable device may use data processed by the display device 100 through the wearable device.

The display unit 180 may convert a video signals, data signal, or OSD signal processed by the control unit 170, or a video signal or data signal received from the external device interface unit 135 into R, G, and B signals, and generate drive signals.

Meanwhile, the display device 100 illustrated in FIG. 2 is only an embodiment of the present disclosure, and therefore, some of the illustrated components may be integrated, added, or omitted depending on the specification of the display device 100 that is actually implemented.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 2, the display device 100 may receive a video through the network interface unit 133 or the external device interface unit 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 2 and but also one of an image processing device such as the separated set-top box and a content playback device including the display unit 180 the audio output unit 185.

The audio output unit 185 may receive a signal audio-processed by the control unit 170 and output the same with audio.

The power supply unit 190 may supply corresponding power to the display device 100. Particularly, power may be supplied to the control unit 170 that may be implemented in the form of a system on chip (SOC), the display unit 180 for video display, and the audio output unit 185 for audio output.

Specifically, the power supply unit 190 may include a converter that converts AC power into DC power, and a dc/dc converter that converts a level of DC power.

The remote control device 200 may transmit a user input to the user input interface unit 150. To this end, the remote control device 200 may use Bluetooth, Radio Frequency (RF) communication, Infrared (IR) communication, Ultra Wideband (UWB), ZigBee, or the like. In addition, the remote control device 200 may receive a video, audio, or data signal or the like output from the user input interface unit 150, and display or output the same through the remote control device 200 by video or audio.

Figure 3:
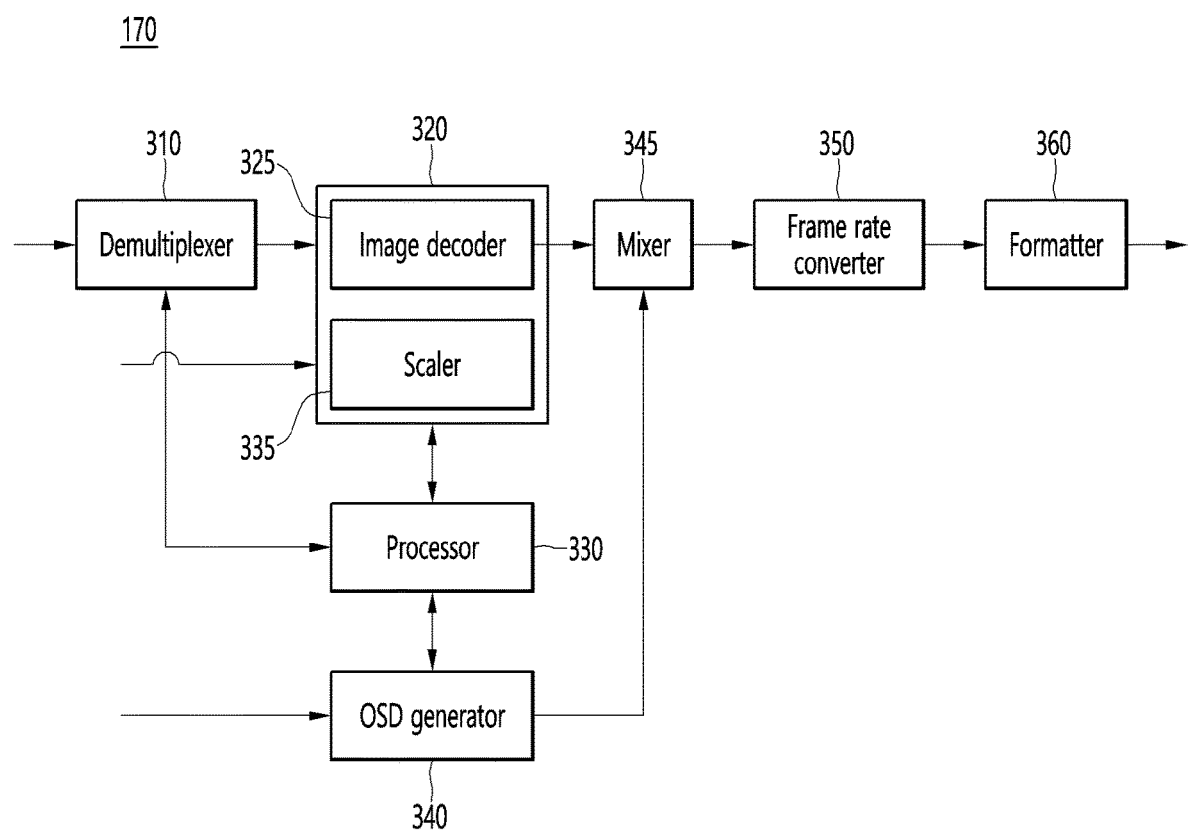
FIG. 3 is an example of an internal block diagram of the control unit of FIG. 2.

FIG. 3 is an example of an internal block diagram of the controller of FIG. 2.

Referring to the drawings, the control unit 170 according to an embodiment of the present disclosure may include a demultiplexer 310, an image processing unit 320, a processor 330, an OSD generator 340, a mixer 345, a frame rate converter 350, and a formatter 360. In addition, an audio processing unit (not shown) and a data processing unit (not shown) may be further included.

The demultiplexer 310 may demultiplex input stream. For example, when MPEG-2 TS is input, the demultiplexer 310 may demultiplex the MPEG-2 TS to separate the MPEG-2 TS into video, audio, and data signals. Here, the stream signal input to the demultiplexer 310 may be a stream signal output from the tuner 131, the demodulator 132 or the external device interface unit 135.

The image processing unit 320 may perform image processing on the demultiplexed video signal. To this end, the image processing unit 320 may include an image decoder 325 and a scaler 335.

The image decoder 325 may decode the demultiplexed video signal, and the scaler 335 may scale a resolution of the decoded video signal to be output through the display unit 180.

The image decoder 325 may be provided with decoders of various standards. For example, an MPEG-2, H.264 decoder, a 3D video decoder for color images and depth images, and a decoder for multi-view images may be provided.

The processor 330 may control the overall operation of the display device 100 or of the control unit 170. For example, the processor 330 may control the tuner 131 to select (tune) an RF broadcast corresponding to a channel selected by a user or a pre-stored channel.

In addition, the processor 330 may control the display device 100 by a user command input through the user input interface unit 150 or an internal program.

In addition, the processor 330 may perform data transmission control with the network interface unit 133 or the external device interface unit 135.

In addition, the processor 330 may control operations of the demultiplexer 310, the image processing unit 320, and the OSD generator 340 in the control unit 170.

The OSD generator 340 may generate an OSD signal according to a user input or by itself. For example, based on a user input signal, a signal for displaying various information on a screen of the display unit 180 as a graphic or text may be generated. The generated OSD signal may include various data such as a user interface screen, various menu screens, widgets, and icons of the display device 100. In addition, the generated OSD signal may include a 2D object or a 3D object.

In addition, the OSD generator 340 may generate a pointer that may be displayed on the display unit 180 based on a pointing signal input from the remote control device 200. In particular, such a pointer may be generated by the pointing signal processing unit, and the OSD generator 340 may include such a pointing signal processing unit (not shown). Of course, the pointing signal processing unit (not shown) may be provided separately, not be provided in the OSD generator 340

The mixer 345 may mix the OSD signal generated by the OSD generator 340 and the decoded video signal image-processed by the image processing unit 320. The mixed video signal may be provided to the frame rate converter 350.

The frame rate converter (FRC) 350 may convert a frame rate of an input video. On the other hand, the frame rate converter 350 may output the input video as it is, without a separate frame rate conversion.

On the other hand, the formatter 360 may change the format of the input video signal into a video signal to be displayed on the display and output the same.

The formatter 360 may change the format of the video signal. For example, it is possible to change the format of the 3D video signal to any one of various 3D formats such as a side by side format, a top/down format, a frame sequential format, an interlaced format, a checker box and the like.

Meanwhile, the audio processing unit (not shown) in the control unit 170 may perform audio processing of a demultiplexed audio signal. To this end, the audio processing unit (not shown) may include various decoders.

In addition, the audio processing unit (not shown) in the control unit 170 may process a base, treble, volume control, and the like.

The data processing unit (not shown) in the control unit 170 may perform data processing of the demultiplexed data signal. For example, when the demultiplexed data signal is an encoded data signal, the demultiplexed data signal may be decoded. The coded data signal may be electronic program guide information including broadcast information such as a start time and an end time of a broadcast program broadcast on each channel.

Meanwhile, a block diagram of the control unit 170 illustrated in FIG. 3 is a block diagram for an embodiment of the present disclosure. The components of the block diagram may be integrated, added, or omitted depending on the specification of the control unit 170 that is actually implemented.

In particular, the frame rate converter 350 and the formatter 360 may not be provided in the control unit 170, and may be separately provided or separately provided as a single module.

Figure 4A:
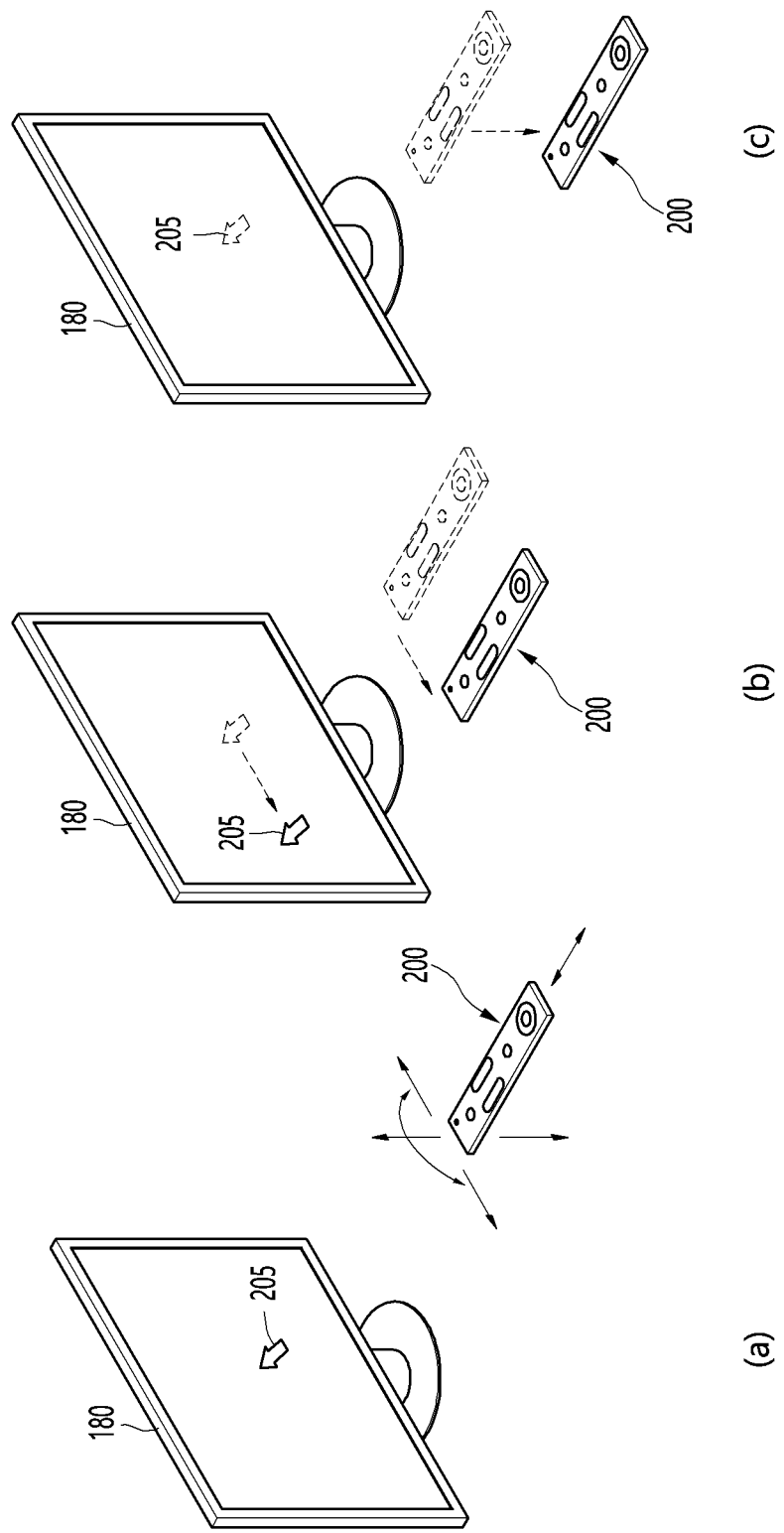
FIG. 4A is a diagram illustrating a control method for a remote control device of FIG. 2.

FIG. 4A is a diagram illustrating a control method for a remote control device of FIG. 2.

In (a) of FIG. 4A, it is illustrated that a pointer 205 corresponding to the remote control device 200 is displayed on the display unit 180.

The user may move or rotate the remote control device 200 up and down, left and right (FIG. 4A (b)), and forward and backward ((c) of FIG. 4A). The pointer 205 displayed on the display unit 180 of the display device may correspond to the movement of the remote control device 200. The remote control device 200 may be referred to as a spatial remote controller or a 3D pointing device, as the corresponding pointer 205 is moved and displayed according to the movement on a 3D space, as shown in the drawing.

In (b) of FIG. 4A, it is illustrated that that when the user moves the remote control device 200 to the left, the pointer 205 displayed on the display unit 180 of the display device moves to the left correspondingly.

Information on the movement of the remote control device 200 detected through a sensor of the remote control device 200 is transmitted to the display device. The display device may calculate the coordinates of the pointer 205 based on information on the movement of the remote control device 200. The display device may display the pointer 205 to correspond to the calculated coordinates.

In (c) of FIG. 4A, it is illustrated that a user moves the remote control device 200 away from the display unit 180 while pressing a specific button in the remote control device 200. Accordingly, a selected region in the display unit 180 corresponding to the pointer 205 may be zoomed in and displayed to be enlarged. Conversely, when the user moves the remote control device 200 close to the display unit 180, the selected region in the display unit 180 corresponding to the pointer 205 may be zoomed out and displayed to be reduced. On the other hand, when the remote control device 200 moves away from the display unit 180, the selected region may be zoomed out, and when the remote control device 200 moves close to the display unit 180, the selected region may be zoomed in.

Meanwhile, in a state in which a specific button in the remote control device 200 is being pressed, recognition of up, down, left, or right movements may be excluded. That is, when the remote control device 200 moves away from or close to the display unit 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Figure 4B:
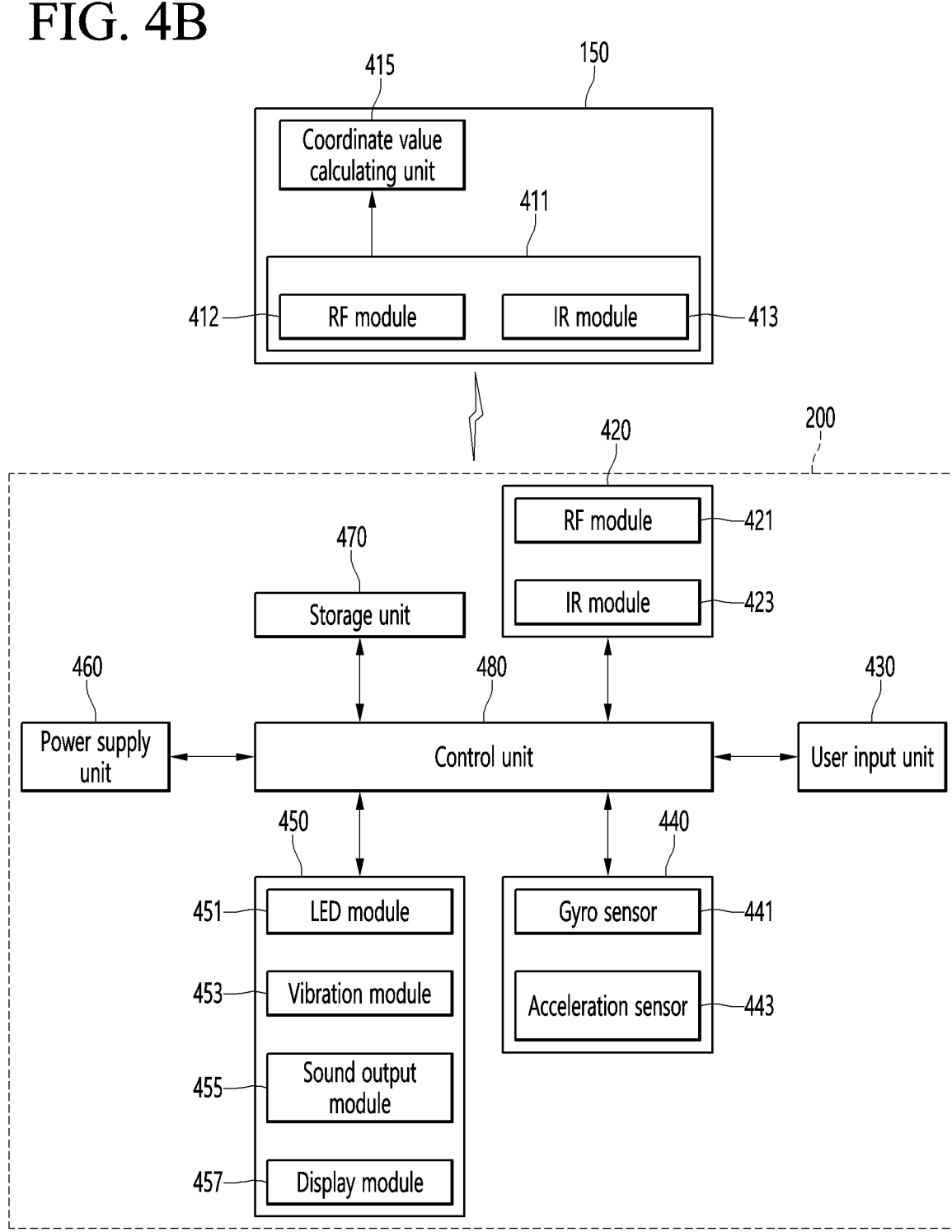
FIG. 4B is an internal block diagram of the remote control device of FIG. 2.

FIG. 4B is an internal block diagram of the remote control device of FIG. 2.

Referring to the drawing, the remote control device 200 may include a wireless communication unit 420, a user input unit 430, a sensor unit 440, an output unit 450, a power supply unit 460, a storage unit 470, ad a control unit 480.

The wireless communication unit 420 may transmit and receive signals to and from any one of the display devices according to the embodiments of the present disclosure described above. Among the display devices according to embodiments of the present disclosure, one display device 100 will be described as an example.

In the present embodiment, the remote control device 200 may include an RF module 421 capable of transmitting and receiving signals to and from the display device 100 according to the RF communication standard. In addition, the remote control device 200 may include an IR module 423 capable of transmitting and receiving signals to and from the display device 100 according to the IR communication standard.

In the present embodiment, the remote control device 200 transmits a signal containing information on the movement of the remote control device 200 to the display device 100 through the RF module 421.

Also, the remote control device 200 may receive a signal transmitted by the display device 100 through the RF module 421. In addition, the remote control device 200 may transmit a command regarding power on/off, channel change, volume adjustment, or the like to the display device 100 through the IR module 423 as necessary.

The user input unit 430 may include a keypad, a button, a touch pad, or a touch screen. The user may input a command related to the display device 100 to the remote control device 200 by operating the user input unit 430. When the user input unit 430 includes a hard key button, the user may input a command related to the display device 100 to the remote control device 200 through a push operation of the hard key button. When the user input unit 430 includes a touch screen, the user may input a command related to the display device 100 to the remote control device 200 by touching a soft key of the touch screen. In addition, the user input unit 430 may include various types of input means that may be operated by a user, such as a scroll key or a jog key, and the present embodiment does not limit the scope of the present disclosure.

The sensor unit 440 may include a gyro sensor 441 or an acceleration sensor 443. The gyro sensor 441 may sense information on the movement of the remote control device 200.

For example, the gyro sensor 441 may sense information on the operation of the remote control device 200 based on the x, y, and z axes. The acceleration sensor 443 may sense information on the movement speed of the remote control device 200 and the like. Meanwhile, a distance measurement sensor may be further provided, whereby a distance to the display unit 180 may be sensed.

The output unit 450 may output a video or audio signal corresponding to the operation of the user input unit 430 or a signal transmitted from the display device 100. The user may recognize whether the user input unit 430 is operated or whether the display device 100 is controlled through the output unit 450.

For example, the output unit 450 may include an LED module 451 that emits light, a vibration module 453 that generates vibration, a sound output module 455 that outputs sound, or a display module 457 that outputs a video when the user input unit 430 is operated or a signal is transmitted and received through the wireless communication unit 420.

The power supply unit 460 supplies power to the remote control device 200. The power supply unit 460 may reduce power consumption by stopping power supply when the remote control device 200 has not moved for a predetermined time. The power supply unit 460 may restart power supply when a predetermined key provided in the remote control device 200 is operated.

The storage unit 470 may store various types of programs and application data required for control or operation of the remote control device 200. When the remote control device 200 transmits and receives signals wirelessly through the display device 100 and the RF module 421, the remote control device 200 and the display device 100 transmit and receive signals through a predetermined frequency band. The control unit 480 of the remote control device 200 may store and refer to information on a frequency band capable of wirelessly transmitting and receiving signals to and from the display device 100 paired with the remote control device 200 in the storage unit 470.

The control unit 480 may control all matters related to the control of the remote control device 200. The control unit 480 may transmit a signal corresponding to a predetermined key operation of the user input unit 430 or a signal corresponding to the movement of the remote control device 200 sensed by the sensor unit 440 through the wireless communication unit 420.

The user input interface unit 150 of the display device 100 may include a wireless communication unit 411 capable of wirelessly transmitting and receiving signals to and from the remote control device 200, and a coordinate value calculating unit 415 capable of calculating coordinate values of a pointer corresponding to the operation of the remote control device 200.

The user input interface unit 150 may transmit and receive signals wirelessly to and from the remote control device 200 through the RF module 412. In addition, signals transmitted by the remote control device 200 according to the IR communication standard may be received through the IR module 413.

The coordinate value calculating unit 415 may correct a hand shake or an error based on a signal corresponding to the operation of the remote control device 200 received through the wireless communication unit 411, and calculate the coordinate values (x, y) of the pointer 205 to be displayed on the display unit 180.

The transmission signal of the remote control device 200 input to the display device 100 through the user input interface unit 150 may be transmitted to the control unit 170 of the display device 100. The control unit 170 may determine information on the operation and key operation of the remote control device 200 based on the signal transmitted by the remote control device 200, and control the display device 100 in response thereto.

As another example, the remote control device 200 may calculate pointer coordinate values corresponding to the operation and output the same to the user input interface unit 150 of the display device 100. In this case, the user input interface unit 150 of the display device 100 may transmit information on the received pointer coordinate values to the control unit 170 without a separate process of correcting a hand shake or error.

In addition, as another example, the coordinate value calculating unit 415 may be provided in the control unit 170 instead of the user input interface unit 150 unlike the drawing.

Figure 5:
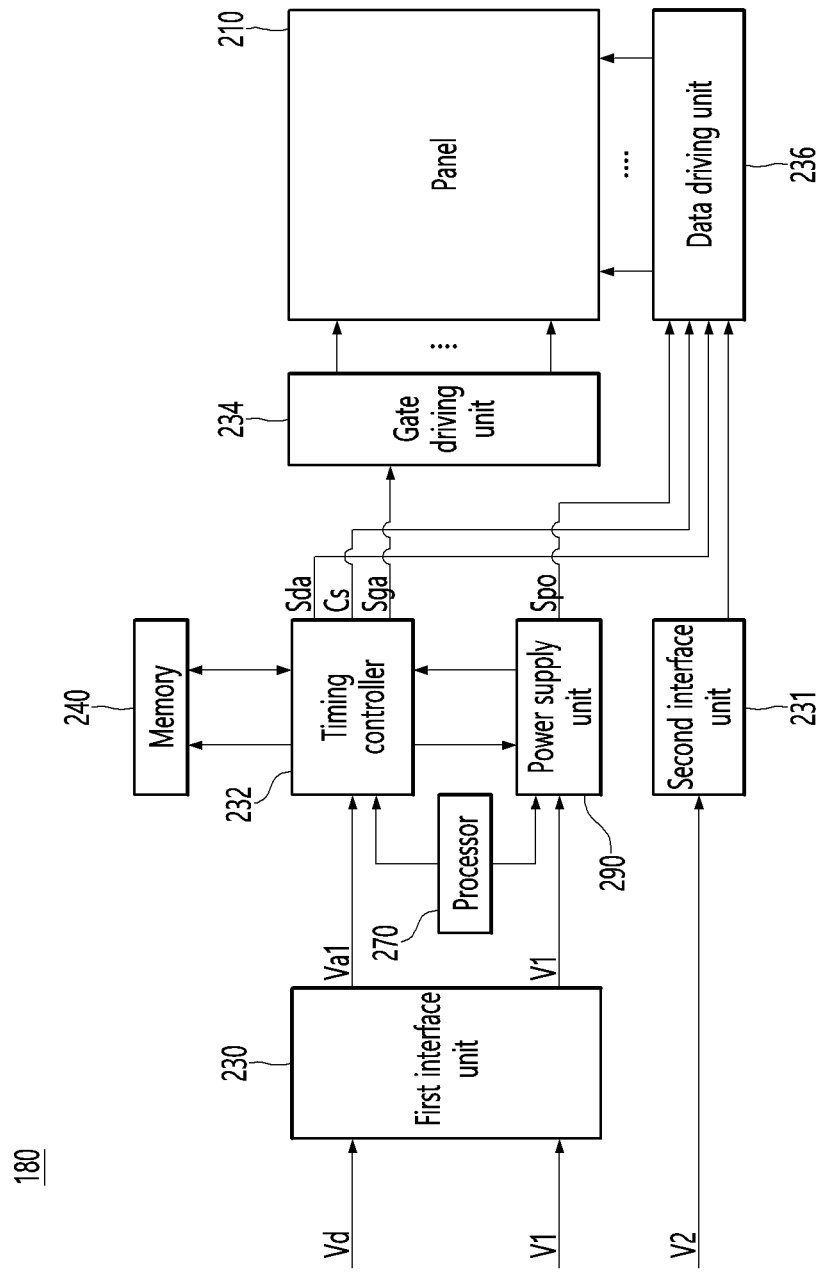
FIG. 5 is an internal block diagram of the display unit of FIG. 2.

FIG. 5 is an internal block diagram of the display unit of FIG. 2.

Referring to the drawing, the display unit 180 based on an organic light emitting panel may include a panel 210, a first interface unit 230, a second interface unit 231, a timing controller 232, a gate driving unit 234, a data driving unit 236, a memory 240, a processor 270, a power supply unit 290, and the like.

The display unit 180 may receive a video signal Vd, first DC power V1, and second DC power V2, and display a predetermined video based on the video signal Vd.

Meanwhile, the first interface unit 230 in the display unit 180 may receive the video signal Vd and the first DC power V1 from the control unit 170.

Here, the first DC power supply V1 may be used for the operation of the power supply unit 290 and the timing controller 232 in the display unit 180.

Next, the second interface unit 231 may receive the second DC power V2 from the external power supply unit 190. Meanwhile, the second DC power V2 may be input to the data driving unit 236 in the display unit 180.

The timing controller 232 may output a data driving signal Sda and a gate driving signal Sga based on the video signal Vd.

For example, when the first interface unit 230 converts the input video signal Vd and outputs the converted video signal val, the timing controller 232 may output the data driving signal Sda and the gate driving signal Sga based on the converted video signal val.

The timing controller 232 may further receive a control signal, a vertical synchronization signal Vsync, and the like, in addition to the video signal Vd from the control unit 170.

In addition, the timing controller 232 may output the gate driving signal Sga for the operation of the gate driving unit 234 and the data driving signal Sda for operation of the data driving unit 236 based on a control signal, the vertical synchronization signal Vsync, and the like, in addition to the video signal Vd.

In this case, the data driving signal Sda may be a data driving signal for driving of RGBW subpixels when the panel 210 includes the RGBW subpixels.

Meanwhile, the timing controller 232 may further output the control signal Cs to the gate driving unit 234.

The gate driving unit 234 and the data driving unit 236 may supply a scan signal and the video signal to the panel 210 through a gate line GL and a data line DL, respectively, according to the gate driving signal Sga and the data driving signal Sda from the timing controller 232. Accordingly, the panel 210 may display a predetermined video.

Meanwhile, the panel 210 may include an organic light emitting layer and may be arranged such that a plurality of gate lines GL intersect a plurality of data lines DL in a matrix form in each pixel corresponding to the organic light emitting layer to display a video.

Meanwhile, the data driving unit 236 may output a data signal to the panel 210 based on the second DC power supply V2 from the second interface unit 231.

The power supply unit 290 may supply various levels of power to the gate driving unit 234, the data driving unit 236, the timing controller 232, and the like.

The processor 270 may perform various control of the display unit 180. For example, the gate driving unit 234, the data driving unit 236, the timing controller 232 or the like may be controlled.

Figure 6:
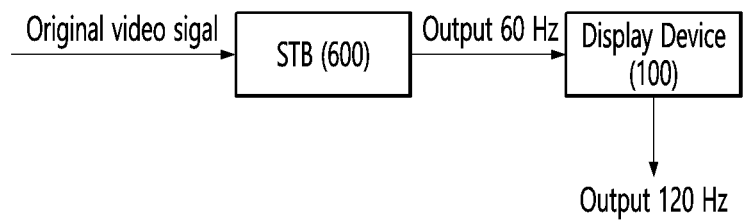
FIG. 6 is a diagram illustrating an image output relationship between a set-top box and a display device according to an embodiment of the present disclosure.

FIG. 6 is a diagram illustrating an image output relationship between the set-top box and the display device according to an embodiment of the present disclosure.

The set-top box 600 may transmit a video signal received from the outside to the display device 100. The external device interface unit 135 of the display device 100 may receive a video signal from the set-top box 600.

The video signal may be any one of a broadcast signal, a content video signal received from an external server, and a video signal received from a connected external device.

The video signal received from the outside by the set-top box 600 is referred to as an original video signal.

The frequency of the original video signal may be any one of 24 Hz, 25 Hz, 30 Hz, and 60 Hz, but this is only an example.

The set-top box 600 may convert a specific frequency of the original video signal into 60 Hz and output the converted 60 Hz video signal.

The set-top box 600 may convert the frame rate of the original video signal input from the outside into 60 Hz.

That is, the output frequency of the video signal output from the set-top box 600 may be fixed to 60 Hz. 60 Hz is only an example.

The process of converting the frequency of the original video signal by the set-top box 600 into 60 Hz may be referred to as pull-down.

The display device 100 may determine the frame rate of the original video based on the 60 Hz video signal received from the set-top box 600.

The display device 100 may determine the number of interpolation frames based on the determined frame rate.

The display device 100 may output the video through the display unit 180 by using the determined number of interpolation frames.

Figure 7:
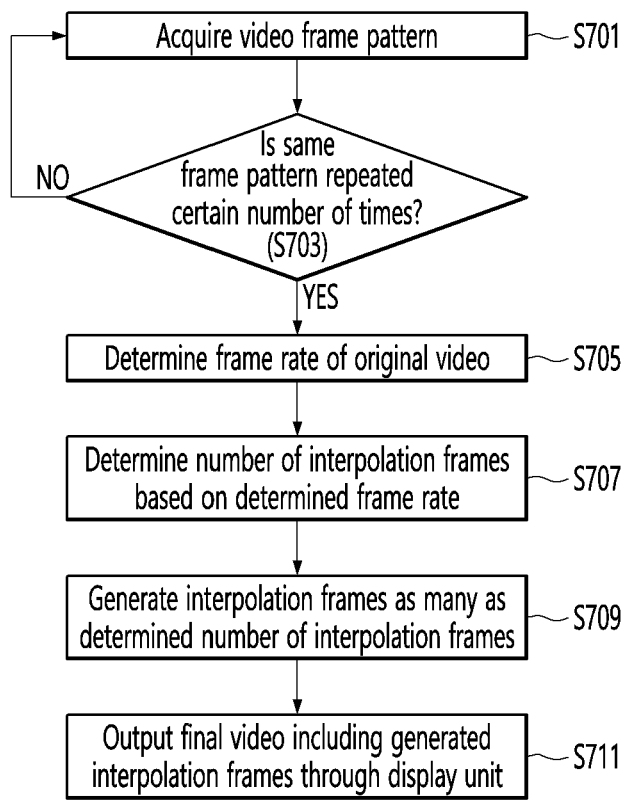
FIG. 7 is a flowchart illustrating an operating method of a display device according to an embodiment of the present disclosure.

FIG. 7 is a flowchart illustrating the operating method of the display device according to an embodiment of the present disclosure.

A frequency described below may refer to a scanning rate of an image.

An input frequency may be a driving frequency of an image signal output by the set-top box 600 connected through the external device interface unit 135.

An output frequency may refer to a driving frequency of an image signal when the display unit 180 outputs an image signal.

It is assumed that the image output frequency of the display unit 180 is set as a first output frequency. The first output frequency may be 120 Hz.

The control unit 170 of the display device 100 acquires a video frame pattern based on a video signal received from the set-top box 600 (S701), and determines whether the same video frame pattern is repeated a certain number of times, based on the acquired video frame pattern (S703).

The frequency of the video signal received from the set-top box 600 may be 60 Hz, but this is only an example. That is, the output frequency of the set-top box 600 may be 60 Hz.

The external device interface unit 135 of the display device 100 may include a High Definition Multimedia Interface (HDMI) terminal.

The external device interface unit 135 may receive a video signal through an external device connected through the HDMI terminal. The external device may be the set-top box 600.

In an embodiment, the video frame pattern may be a pattern obtained based on the number of repetitions of the same video frame. The video frame pattern may be referred to as video cadence.

The video cadence may be a ratio of a repetitive pattern of video frames. The video cadence may represent a repetitive flow of input video frames.

For example, when the first video frame is detected three times and then the second video frame is detected twice, the video frame pattern may be obtained as 3:2.

As another example, when the first video frame is detected four times, the second video frame is twice, the third video frame is twice, and the fourth video frame is twice, the video frame pattern may be 4:2:2:2.

A process of acquiring the video frame pattern will be described.

Figure 8:
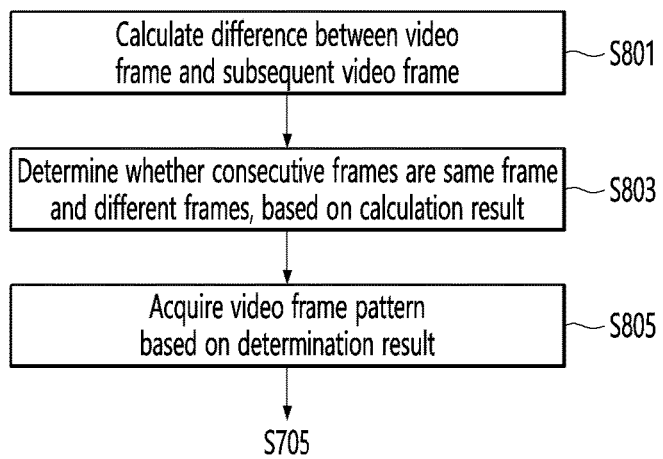
FIG. 8 is a flowchart illustrating a process of acquiring, by a display device, video frame pattern according to an embodiment of the present disclosure.

FIG. 8 is a flowchart illustrating a process of acquiring, by the display device, the video frame pattern according to an embodiment of the present disclosure.

Referring to FIG. 8, the control unit 170 of the display device 100 calculates a difference between the video frame and the subsequent video frame (S801).

In an embodiment, the control unit 170 may calculate a sum of absolute difference (SAD) between consecutive video frames. The SAD may be a sum value obtained by summing the difference between pixel values of consecutive video frames.

The control unit 170 determines whether two consecutive frames are the same frame or different frames, based on the calculation result (S803).

When the SAD is less than a preset value, the control unit 170 may determine that two consecutive frames are the same frame.

When the SAD is greater than or equal to the preset value, the control unit 170 may determine that two consecutive frames are different frames.

The control unit 170 acquires a video frame pattern based on the determination result (S805).

The control unit 170 may acquire a video frame pattern indicating a repetition pattern of video frames, based on the determination result.

This will be described with reference to FIGS. 9 and 10.

Figure 9:
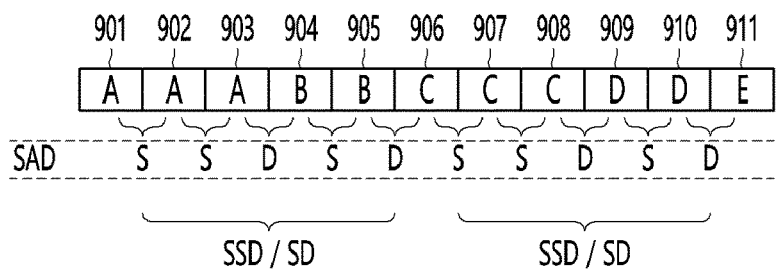
FIGS. 9 and 10 are diagrams illustrating a process of acquiring video frame pattern using SAD according to an embodiment of the present disclosure.
Figure 10:
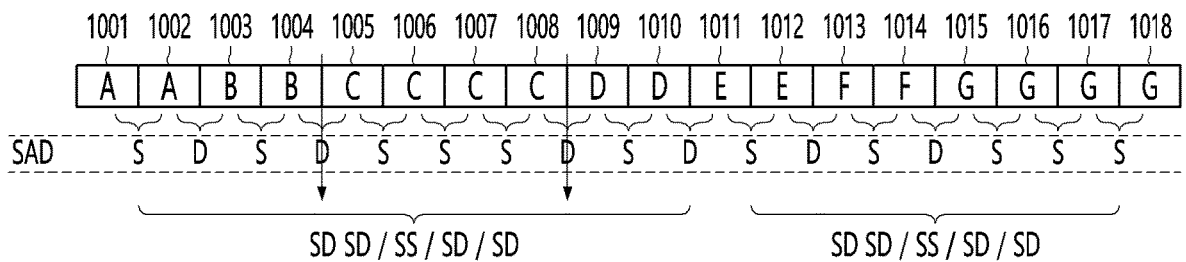

FIGS. 9 and 10 are diagrams illustrating the process of acquiring the video frame pattern using SAD according to an embodiment of the present disclosure.

First, FIG. 9 is described.

Referring to FIG. 9, 11 video frames 901 to 911 output from the set-top box 600 are illustrated.

The control unit 170 of the display device 100 may calculate the SAD between two consecutive frames.

The control unit 170 may determine whether the two frames are the same frame or different frames, based on the calculation result.

In FIG. 9, S (abbreviation for same) means that two frames are determined to be the same frame, and D (abbreviation for different) may mean that two frames are determined to be different frames.

It may be determined that the first to third video frames 901 to 903 are the same frame A, the fourth and fifth video frames 904 and 905 are the same frame B, the sixth to eighth video frames 906 to 908 are the same frame C, and the ninth and tenth video frames 909 and 910 are the same frame D.

The control unit 170 may acquire a video frame pattern by using the calculated 10 SADs.

The control unit 170 may acquire the SSD/SD result as a 3:2 pattern.

Meanwhile, since the SSD/SD pattern is repeated twice, the control unit 170 may determine 3:2 as the video frame pattern.

First, FIG. 10 is described.

Referring to FIG. 10, 18 video frames 1001 to 1019 output from the set-top box 600 are illustrated.

The control unit 170 of the display device 100 may calculate the SAD between two consecutive frames.

The control unit 170 may determine whether the two frames are the same frame or different frames, based on the calculation result.

In FIG. 10, S (abbreviation for same) means that two frames are determined to be the same frame, and D (abbreviation for different) may mean that two frames are determined to be different frames.

It may be determined that the first and second video frames 1001 and 1002 are the same frame A, the third and fourth video frames 1003 and 1004 are the same frame B, the fifth to eighth video frames 1005 to 1008 are the same frame C, the ninth and tenth video frames 1009 and 1010 are the same frame D, the eleventh and twelfth video frames 1011 and 1012 are the same frame E, the thirteenth and fourteenth video frames 1013 and 1014 are the same frame F, and the fifteenth to eighteenth video frames 1015 to 1018 are the same frame G.

The control unit 170 may acquire a video frame pattern by using the calculated SAD results.

The first four video frame patterns are determined as SD/SD, but since several types of cadence may appear, SDA values between the next frames are further examined.

When it is determined that the SDSD/SS/SD/SD pattern is repeated twice, the control unit 170 may determine the video frame pattern as 4:2:2:2.

FIG. 7 is described again.

A predetermined number of times may be twice, but this is only an example.

For example, the control unit 170 may determine whether the 3:2 video frame pattern is repeated twice.

When the same video frame pattern is repeated a certain number of times, the control unit 170 determines a frame rate of original video corresponding to the repeated frame pattern (S705).

When the video frame pattern is repeated a certain number of times, the control unit 170 may determine the frame rate of the original video based on the cadence combination table stored in the storage unit 140.

The cadence combination table may be a table obtained by matching video frame patterns between the frequency of the original video and the output frequency. Here, the output frequency may be a frequency of a video signal output from the set-top box 600.

The control unit 170 may extract the frequency of the original video corresponding to the output frequency and the repeated video frame pattern from the cadence combination table. The control unit 170 may determine the extracted frequency of the original video as the frame rate of the original video.

The cadence combination table will be described with reference to FIG. 11.

FIG. 11 is a diagram describing the cadence combination table according to an embodiment of the present disclosure.

The cadence combination table 1100 may also be referred to as a video frame pattern combination table.

The cadence combination table 1100 may be stored in the storage unit 140.

Referring to FIG. 11, the cadence combination table 1100 representing the cadence combination between the input frequency of the original video and the output frequency of the set-top box 600 is shown.

It is assumed that the output frequency of the set-top box 600 is 60 Hz.

Referring to the table of FIG. 11, when the frequency of the original video is 24 Hz and the output frequency of the set-top box 600 is 60 Hz, the cadence combination is any one of 3:2, 3:2:2:3 (or 2:3:3:2), and 2:2:2:4 (or 4:2:2:2).

As described with reference to FIG. 9, when the video frame pattern of the original video is determined as 3:2, the control unit 170 may determine the frequency of the original video as 24 Hz.

That is, when the cadence is 3:2, the control unit 170 may determine the input frequency of the original video corresponding thereto as 24 Hz by referring to the cadence combination table 1100.

As another example, when the cadence is 2:2, the control unit 170 may determine the input frequency of the original video corresponding thereto as 30 Hz by referring to the cadence combination table 1100.

FIG. 7 is described again.

The control unit 170 determines the number of interpolation frames based on the determined frame rate of the original video (S707).

In an embodiment, the control unit 170 may generate the interpolation frame so as to compensate for other frames as the frequency of the original video signal and the frequency of the video signal to be output through the display unit 180 of the display device 100 are different.

The control unit 170 may generate interpolation frames by performing a motion processing process based on the original video frames constituting the original video.

The motion processing process may be a motion estimation/motion compensation (MEMC) process.

The motion estimation (ME) may be a method of dividing a video frame into a plurality of small blocks, estimating which block is moved from the previous frames of the current video frame or the future precoded frames, and predicting the current block.

The motion compensation (MC) may compensate for a difference between a predicted value and an actual value so as to compensate for inaccuracy of motion estimation.

The control unit 170 may calculate the number of interpolation frames required for the motion processing process by using the frame rate of the original video.

The control unit 170 generates interpolation frames as many as the determined number of interpolation frames (S709), and outputs a final video including the generated interpolation frames through the display unit 180 (S711).

Operations S707 to S711 will be described with reference to the following drawings.

Figure 12:
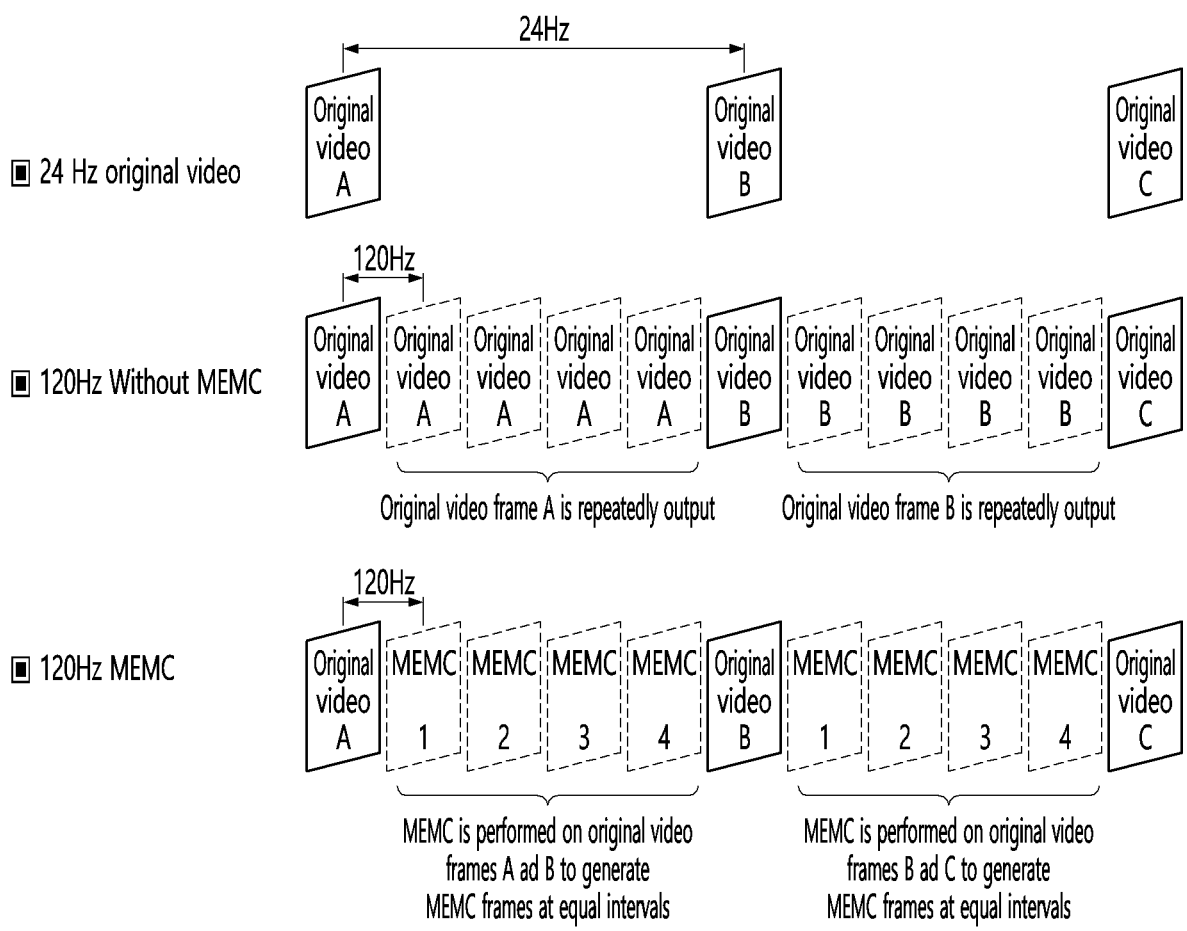
FIG. 12 is a diagram describing a method of generating a frame through MEMC according to an embodiment of the present disclosure.

FIG. 12 is a diagram describing a method of generating a frame through MEMC according to an embodiment of the present disclosure.

It is assumed that the frequency of the original video is 24 Hz, and the output frequency of the display device 100 is 120 Hz.

The original video may be input at a rate of 24 frames per second.

When the MEMC process is not performed, the display device 100 repeats four original video frames A. This is because the frequency of the original video and the output frequency of the display device 100 are different by five times.

If the MEMC process is performed, the display device 100 may generate four MEMC frames MEMC 1, MEMC 2, MEMC 3, and MEMC 4, which have undergone the MEMC process, by using the original video frame A and the original video frame B following the original video frame A.

Since the MEMC frame is generated between two video frames, the MEMC frame may be referred to as the interpolation frame.

When the MEMC process is used, the video output through the display device 100 may feel more natural than when the MEMC process is not used.

FIG. 13 is a diagram describing that, when the frequency of original video is different, the number of interpolation frames generated is different.

Referring to FIG. 13, a case in which the frequency of the original video is 24 Hz and a case in which the frequency of the original video is 60 Hz are compared. In FIG. 13, it is assumed that the output frequency of the display device 100 is 120 Hz.

When the frequency of the original video is 24 Hz, the display device 100 may generate four MEMC frames between two original video frames A and B.

When the frequency of the original video is 60 Hz, the display device 100 may generate one MEMC frame between two original video frames A and B.

That is, in the display device 100, the number of interpolation frames to be generated may be changed as the frequency of the original video is changed.

Meanwhile, the output frequency of the set-top box 600 is generally 60 Hz, but when actually measured, the output frequency of the set-top box 600 may be slightly different, such as 59.1 Hz.

That is, the set-top box 600 can output video so that the video has a constant frequency, but actually, the output frequency is different, so that a video frame is missing or a video frame pattern (or cadence) is switched. This is called bad-editing.

When bad-editing occurs, severe vibration such as Judder may occur upon watching video, which may cause great inconvenience to the viewer.

In an embodiment of the present disclosure, when bad-editing occurs, the number of interpolation frames is adaptively adjusted so as to improve the Judder phenomenon that seems to be cut off.

Figure 14:
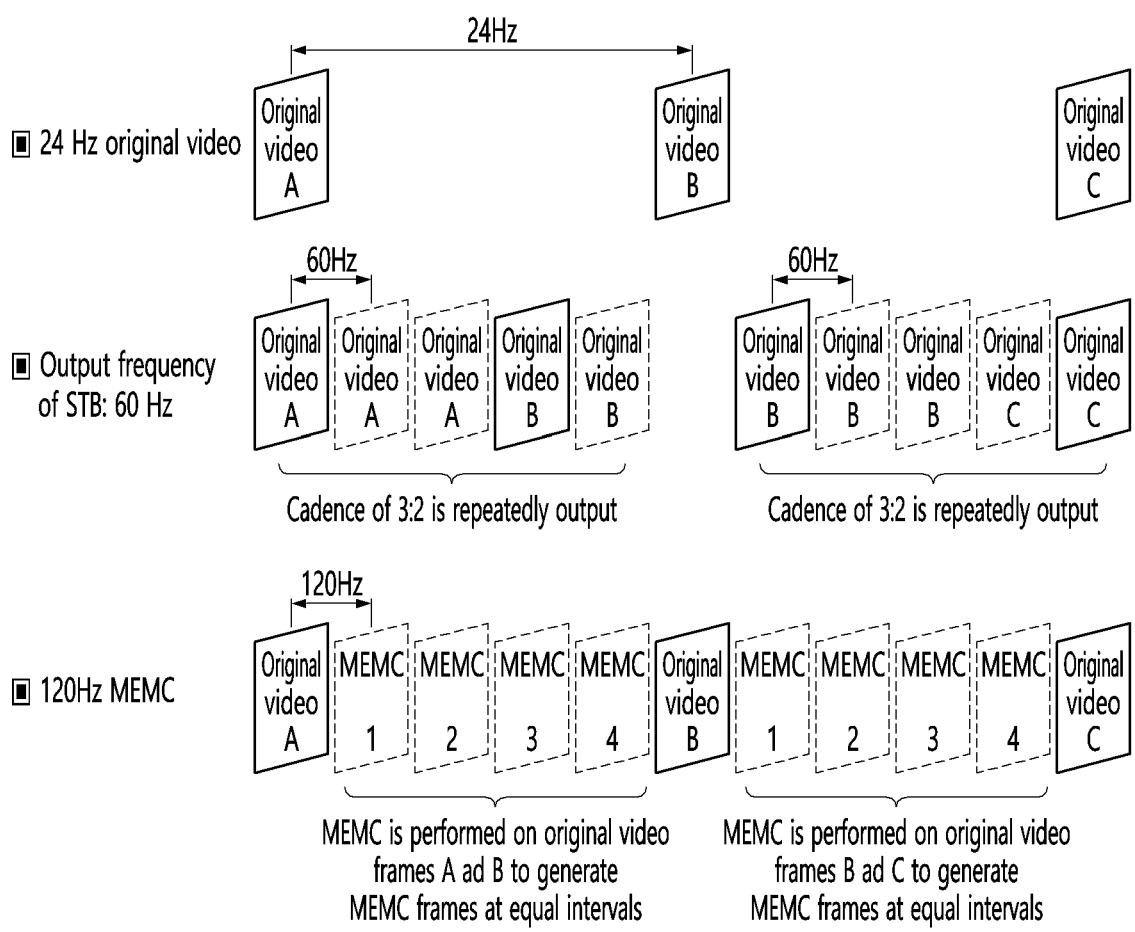
FIG. 14 is a diagram describing a process of determining a frame rate of an original video and generating interpolation frames based on the frame rate, according to an embodiment of the present disclosure.

FIG. 14 is a diagram describing a process of determining a frame rate of original video and generating interpolation frames based on the frame rate, according to an embodiment of the present disclosure, FIG. 15 is a diagram for comparing an example of determining the number of interpolation frames when bad-editing does not occur, according to a conventional embodiment and an embodiment of the present disclosure, and FIG. 16 is a diagram for comparing an example of determining the number of interpolation frames when bad-editing occurs, according to a conventional embodiment and an embodiment of the present disclosure.

First, FIG. 14 is described.

Referring to FIG. 14, the frequency of the original video is 24 Hz. After the original video is input to the set-top box 600, the set-top box 600 may convert (or pull-down) the frequency of the original video to 60 Hz and output the converted frequency.

The set-top box 600 may output video frames having a cadence of 3:2.

The display device 100 may calculate the cadence of the original video based on the 60 Hz video frames output from the set-top box 600. This is the same as described with reference to FIGS. 9 and 10.

The display device 100 may determine the frequency of the original video as 24 Hz, and may determine the number of MEMC frames based on the determined frequency of the original video.

Since the output frequency of the display device 100 is 120 Hz and the frequency of the original video is 24 Hz, the display device 100 may generate four interpolation frames (MEMC 1 to 4) per one original video frame.

Next, FIGS. 15 and 16 are described.

FIG. 15 is a case in which the output frequency of the set-top box 600 is constant at 60 Hz, and FIG. 16 is a case in which the output frequency of the set-top box 600 is not fixed at 60 Hz, and thus bad-editing occurs.

In the table of FIG. 15, a first row 1501 may be a row indicating partial cadence.

A second row 1503 may indicate the number of frames F corresponding to partial cadence when converting 60 Hz video into 120 Hz video.

A third row 1505 may indicate the number of frames F−1 to be generated.

A fourth row 1507 may indicate the number of MEMC frames to be generated when an adaptive mode or an adaptive video mode of the present disclosure is applied. The adaptive mode may be a mode in which the number of interpolation frames is dynamically changed when cadence is switched or frames are missing.

The control unit 170 may change the number of interpolation frames when it is detected that the video frame is missing or the cadence is changed.

A fifth row 1509 may indicate the number of MEMC frames to be generated in a conventional method.

When the output frequency of the set-top box 600 is fixed to 60 Hz, a video frame pattern (or cadence) of 3:2 may be repeatedly detected.

Since the output frequency of the display device 100 is 120 Hz, six frames and four frames have to be output in a 3:2 video frame pattern of one cycle.

Accordingly, the number of frames to be generated is five frames and three frames excluding the original frame.

However, this is the number of frames before MEMC is performed, and if MEMC is considered, the number of interpolation frames to be generated is changed.

That is, as shown in FIG. 14, in reality, the display device 100 may generate four interpolation frames (MEMC 1 to 4) for one original video frame A.

Conventionally, the number of interpolation frames has been generated by using only the video frame pattern (3:2, 1511) of one cycle. That is, four, which is half the sum (5+3) 1531 of the number of frames to be generated corresponding to the video frame pattern (3:2) 1511 of one cycle, is determined as the number of interpolation frames.

Thereafter, the number of interpolation frames may be calculated by shifting the partial cadence one by one.

According to an embodiment of the present disclosure, the display device 100 may determine the number of interpolation frames by using a video frame pattern (3:2:3:2) 1513 of two cycles.

That is, the display device 100 may determine, as the number of interpolation frames, 4 which is obtained by dividing the sum (5+3+5+3) 1533 of the number of frames to be generated corresponding to the video frame pattern (3:2:3:2) 1513 of two cycles by 4.

As another example, the display device 100 may determine the number of interpolation frames based on 10 video frames previously output from the set-top box 600.

That is, the display device 100 may determine, as the number of interpolation frames, 4 which is obtained by dividing the sum (5+3+5+3) 1533 of the number of frames to be generated corresponding to the 10 video frame pattern (3:2:3:2) 1513 by 4.

Thereafter, the number of interpolation frames may be calculated by shifting the partial cadence one by one.

In FIG. 15, since a video signal having a constant output frequency from the set-top box 600 is input to the display device 100, the conventional method and the method of determining the number of interpolation frames according to the present disclosure are the same.

Next, FIG. 16 is described.

FIG. 16 is a table describing a process of determining the number of interpolation frames when the output frequency of the set-top box 600 is not fixed, or in an abnormal output state in which video frames are missing.

Referring to FIG. 16, the cadence of the third cycle was switched to 3:3 instead of 3:2.

In the conventional method, when the cadence is switched, the number of interpolation frames is fixed to 2.

That is, since the number of interpolation frames is generated by using only the video frame pattern (3:3) 1610 of one cycle, five which is half the sum of the number of frames (5+5) 1621 is calculated as the number of interpolation frames.

However, in this case, the Judder phenomenon occurs, and the image may appear to be cut off. In the conventional method, when the cadence is switched, the number of interpolation frames is fixed to two.

In order to further improve the Judder phenomenon than the conventional method, the display device 100 according to an embodiment of the present disclosure may determine the number of interpolation frames based on the sum of frames to be generated in the cadence of two cycles.

Specifically, the display device 100 may detect that the cadence is switched from 3:2 to 3:3. When the cadence is switched, the display device 100 may calculate the sum of frames to be generated in the cadence of two cycles. Here, the sum (5+3+5+5) 1631 of frames to be generated in the cadence of two cycles is 18.

The display device 100 may determine the number of interpolation frames based on a value obtained by dividing 18, which is the sum of frames, by the number (4) of partial cadences. The display device 100 may determine, as the number of interpolation frames, 4 which is an integer part at 18/4=4.5.

As described above, according to an embodiment of the present disclosure, when the cadence change or the frame omission occurs, the adaptive mode may be applied to improve the Judder phenomenon.

Figure 17:
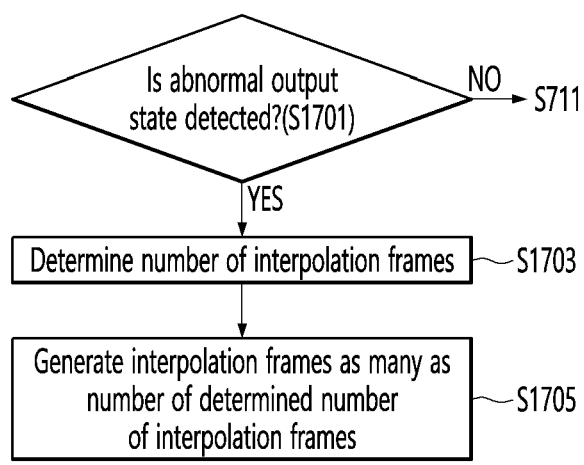
FIG. 17 is a flowchart specifically describing a process of executing an adaptive mode when an abnormal output state of video is detected, according to an embodiment of the present disclosure.

FIG. 17 is a flowchart specifically illustrating a process of executing an adaptive mode when an abnormal output state of video is detected according to an embodiment of the present disclosure.

FIG. 17 may be performed after operation S711 of FIG. 7.

The control unit 170 of the display device 100 checks whether an abnormal output state is detected for 60 Hz video frames output from the set-top box 600 (S1701).

In an embodiment, when the video frame pattern is switched, the control unit 170 may determine that an abnormal output state has been detected.

In another embodiment, when a video frame is missing, the control unit 170 may determine that an abnormal output state has been detected. When a video frame is missing, the video frame pattern may be switched. That is, a case in which the video frame is missing may be included in a case in which the video frame pattern is switched.

When an abnormal output state is detected, the control unit 170 determines the number of interpolation frames based on a certain number of video frames previously output (S1703).

When an abnormal output state of video output from the set-top box 600 is detected, the control unit 170 may calculate the number of interpolation frames.

The control unit 170 may determine the number of interpolation frames by using 10 video frames previously output from the set-top box 600.

Specifically, the control unit 170 may determine, as the number of interpolation frames, a value obtained by dividing the sum of the number of video frames to be generated by 4 in correspondence to the previous 10 video frames.

Thereafter, the control unit 170 may calculate the number of interpolation frames by shifting the partial video frame pattern (partial cadence) one by one.

The control unit 170 generates interpolation frames as many as the determined number of interpolation frames (S1705), and outputs the generated interpolation frames (S1707).

The embodiments of FIGS. 6 to 17 can be applied regardless of display panels such as OLED and LCD.

According to an embodiment of the present disclosure, the feeling of disconnection occurring when an image is abnormally output may disappear.

Accordingly, the user feels the naturalness of the image output, and thus the degree of immersion in viewing the image may be improved.

According to an embodiment of the present disclosure, the above-described methods may be implemented as processor-readable code in a medium on which a program is recorded. Examples of the processor-readable medium include ROM, RAM, CD-ROM, magnetic tape, floppy disk, optical data storage, and the like, and are implemented in the form of carrier waves (for example, transmission over the Internet).

The display devices described above are not limited to the configuration and method of the above-described embodiments, and the embodiments may be configured by selectively combining all or part of the embodiments so that various modifications can be made thereto.

What is claimed is:

1. A display device comprising:
    a display unit;
    an interface unit configured to receive a video having a second frequency from an external device, wherein an original video was converted from a first frequency to the video having the second frequency by the external device; and
    a control unit configured to:
        detect an abnormal output state based on the video having the second frequency;
        determine a number of interpolation frames to be generated based on detecting the abnormal state;
        generate the interpolation frames based on the determined number; and
        output the video to include the generated interpolation frames and having a third frequency,
    wherein the control unit is further configured to determine the number of interpolation frames to be generated based on a previous 10 video frames of the video having the second frequency
    wherein the number of interpolation frames is determined by determining a sum of a number of frames generated for converting the original video from the first frequency to the video having the second frequency for the previous 10 video frames, and dividing the sum by 4.

2. The display device according to claim 1, wherein the control unit is further configured to detect the abnormal output state based on a switch in a video frame pattern of the video.

3. The display device according to claim 2, wherein the control unit is further configured to:
    determine the first frequency of the original video based on detecting a video frame pattern of the video having the second frequency; and
    determine the number of interpolation frames to be generated based on the first frequency.

4. The display device according to claim 1, wherein the control unit is further configured to generate the interpolation frames by performing motion estimation and motion compensation based on two consecutive frames of the original video.

5. The display device according to claim 1, wherein the first frequency is 24 Hz, the second frequency is 60 Hz, and the third frequency is 120 Hz.

6. An operating method of a display device, the operating method comprising:
    receiving a video having a second frequency from an external device, wherein an original video was converted from a first frequency to the video having the second frequency by the external device;
    detecting an abnormal output state based on the video having the second frequency;
    determining a number of interpolation frames to be generated based on detecting the abnormal state;
    generating the interpolation frames based on the determined number; and
    outputting the video to include the interpolation frames and having a third frequency,
    wherein the number of interpolation frames is determined based on a previous 10 video frames of the video having the second frequency,
    wherein the number of interpolation frames is determined by determining a sum of a number of frames generated for converting the original video from the first frequency to the video having the second frequency for the previous 10 video frames, and dividing the sum by 4.

7. The operating method according to claim 6, wherein the abnormal output state is detected based on a switch in a video frame pattern of the video.

8. The operating method according to claim 7, further comprising:
    determining the first frequency of the original video based on detecting a video frame pattern of the video having the second frequency; and
    determining the number of interpolation frames to be generated based on the first frequency.

9. The operating method according to claim 6, wherein the interpolation frames are generated by performing motion estimation and motion compensation based on two consecutive frames of the original video.

10. The operating method according to claim 6, wherein the first frequency is 24 Hz, the second frequency is 60 Hz, and the third frequency is 120 Hz.

* * * * *